No. 709,790. Patented Sept. 23, 1902.
E. B. MEYROWITZ.
OPTHALMOSCOPE.
(Application filed Sept. 25, 1901.)
(No Model.)
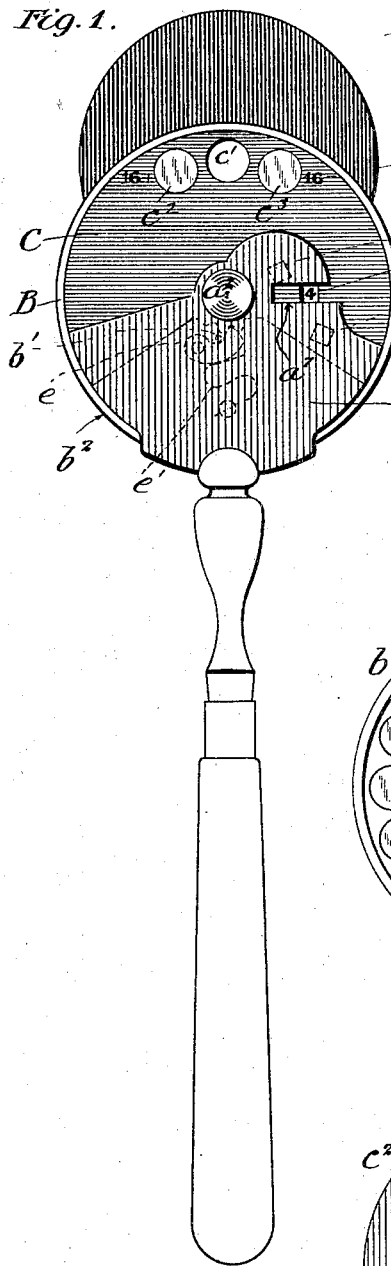
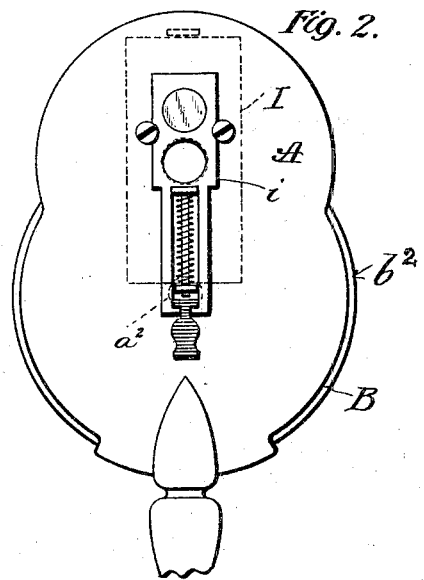
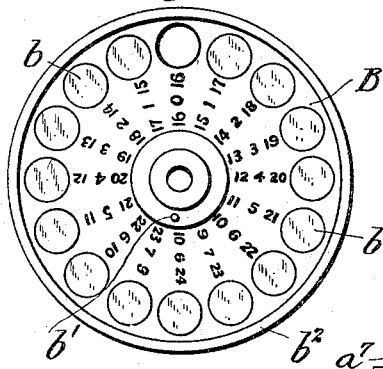
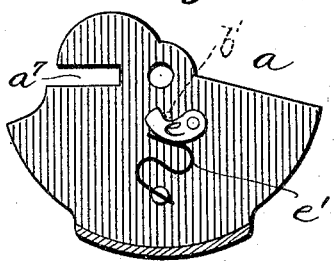
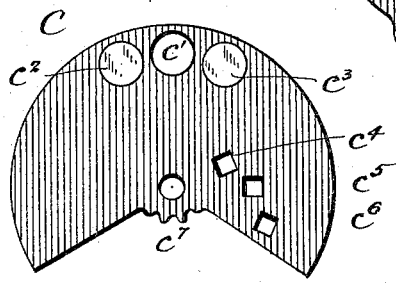
Witnesses
Frank S. Ober
Waldo M. Chapin
Inventor
Emil B. Meyrowitz
By his Attorney
Wm. A. Rosenbaum
THE NORRIS PETERS CO., PHOTO-LITHO., WASHINGTON, D. C.

UNITED STATES PATENT OFFICE.

EMIL B. MEYROWITZ, OF NEW YORK, N. Y., ASSIGNOR TO THE MEYROWITZ MANUFACTURING COMPANY, A CORPORATION OF NEW JERSEY.

OPHTHALMOSCOPE.

SPECIFICATION forming part of Letters Patent No. 709,790, dated September 23, 1902.

Application filed September 25, 1901. Serial No. 76,501. (No model.)

*To all whom it may concern:*

Be it known that I, EMIL B. MEYROWITZ, a citizen of the United States, residing at the city of New York, in the borough of Manhattan and State of New York, have invented certain new and useful Improvements in Ophthalmoscopes, of which the following is a full, clear, and exact description.

This invention relates to ophthalmoscopes designed for testing the focus of vision by means of dioptric lenses.

The object of the invention is to produce an instrument which is cheap to construct, simple in operation, and capable of giving a ready indication of the value of the lenses in use at any given time.

The invention embodies a main lens-carrying disk adapted to be rotated by force applied to its periphery, a segment carrying supplemental lenses, each one of which is adapted to be used successively with all of the lenses in the main disk, and a locking and unlocking device whereby the segment is held stationary while the main disk is making a complete rotation and is automatically released and allowed to rotate with the main disk through the space of one lens at the end of each rotation of the main disk to thereby bring a new supplemental lens into position to coöperate with the main lens and at the same time disclose the figures of a new scale of lens values corresponding to the combinations to be made during the next rotation of the main disk.

The invention will be described in detail with reference to the accompanying drawings, in which—

Figure 1 is a front view of my improved ophthalmoscope. Fig. 2 is a rear view of the same. Fig. 3 is an edge view. Fig. 4 is a face view of the main disk. Fig. 5 is a face view of the segment, and Fig. 6 is a view of the inner side of the guard-plate.

The frame of the instrument consists of a back plate A and a front plate or guard $a$, the two plates being parallel to each other and separated only a sufficient distance to accommodate the lens-carriers. The upper part of the back plate contains a hole $a'$, through which the eye of the operator is directed.

On an axis $a^2$, fixed to the back plate, is the main lens-carrying disk B, having lenses $b$ arranged in a circle near its periphery and adapted to be brought successively into line with the opening $a'$. These lenses are of $+$ and $-$ values, as usual, being arranged in a graduated series, (indicated by the middle circle of figures shown on the face of the disk,) the lens-space opposite zero being vacant and the $+$ and $-$ values running in opposite directions therefrom, the figures of one set being white and of the other red or of any other contrasting colors for distinction. The inner circle of figures indicate the values when the main lenses are successively combined with one of the supplemental lenses, to be referred to, and the outer circle gives the values of combinations with another supplemental lens. Adjacent to its hub the disk carries a pin $b'$, and around the edge of the disk is a flange $b^2$, milled exteriorly, so that by pushing against the edge of the disk with the finger it can be rotated.

Mounted on the hub of the main disk is a segment C of such radius as to fit inside of the flange $b^2$ and resting against the face of disk B, with a tendency to turn therewith by reason of a certain frictional engagement between them. This segment is provided with three lens-openings grouped together near its periphery, the middle opening $c'$ being vacant and those on each side $c^2$ and $c^3$ having lenses of $+$ and $-$ values, each, as shown, being sixteen. The openings are in position to be swung into line with the lenses $b$ and the opening $a$ to afford various combinations with the former. The segment is furthermore provided with three openings $c^4$, $c^5$, and $c^6$, located, respectively, over the three circles of figures on disk B and spaced circularly the angular distance between the lenses. Near the axis of the segment are formed three notches $c^7$, corresponding in angular position with the openings $c^4$, $c^5$, and $c^6$. The guard-plate or mask $a$ is segmental in shape and is provided with an elongated slot or notch $a^7$, occupying a radial position and extending across the three circles of figures on disk B. On its inner side the guard carries a pivoted pawl $e$, adapted to engage the notches $c^7$ and be held in such engagement by a spring $e'$, also attached to the guard. The end of the pawl is adapted to be struck on either side by the pin $b'$ and forced out of a notch. The pawl normally prevents the segment C from turning with disk B; but when the disk carries the pin $b'$ against the pawl and removes it the frictional engagement between the disk and segment causes the latter to move with the former far enough to bring a new lens in the segment opposite the visual opening, whereupon the pin having been carried beyond the pawl allows the latter to fall into the next notch and again lock the segment. The segment then remains stationary during a complete rotation of the disk, during which time any number of lenses in the disk can be successively tried in combination with the particular lens in the segment. When the segment is thus shifted to bring a different supplemental lens into use, it is necessary to at the same time expose the new scale of values, and this is done by the movement of the segment which brings a different opening $c^4$, $c^5$, or $c^6$ into the slot $a'$ and carries the one which was formerly exposed therein behind the guard-plate. When the segment is in the mid-position, its vacant opening $c'$ is opposite the visual opening, and the opening $c^5$ and middle scale are then exposed and the pawl is in the middle notch. From this position the instrument can be turned in either direction.

Attached to the back of frame-plate A is a slide $i$ of usual construction carrying a half-diopter, which can be brought in front of the opening when needed. There is also the usual reflecting-mirror I, having an opening at the center.

It will be seen that this instrument can be operated without removing it from the eye to shift the supplemental lenses, as is necessary in some instruments, and the exposure of the scales is accomplished without complex and delicate mechanism, such as pointers on the exterior coöperating with the supplemental lens-carrier on the inside. The instrument is therefore very serviceable and easily handled.

Having described my invention, I claim—

1. In an ophthalmoscope, the combination of a lens-disk, and a concentric supplemental lens-carrier, frictionally connected to rotate together, a frame supporting the disk and carrier, and a lock for the said carrier, preventing its rotation with the disk.

2. In an ophthalmoscope, the combination of a supporting-frame, a lens-disk, and a concentric supplemental lens-carrier, frictionally connected to rotate together and a lock for the said carrier, preventing its rotation with the disk, and means for releasing and reëngaging said lock at the end of each rotation of the disk.

3. In an ophthalmoscope, the combination of a supporting-frame, a lens-disk, and a concentric supplemental lens-carrier, frictionally connected to rotate together and a pawl pivoted to the frame normally engaging the carrier to prevent its rotation and means carried by the disk, for removing the pawl at the end of each rotation, substantially as described.

4. In an ophthalmoscope, the combination of a supporting-frame, a lens-disk, having a plurality of scales marked thereon, a concentric segment carrying supplemental lenses to which the scales correspond, openings in the segment respectively exposing the scales, a guard covering all of said openings except one, a pawl pivoted to the frame adapted to hold the segment stationary and a pin carried by the disk and adapted to remove the pawl.

In witness whereof I subscribe my signature in presence of two witnesses.

EMIL B. MEYROWITZ.

Witnesses:
D. KUTTAS,
JOHN F. LYNCH.